United States Patent
Sato et al.

[11] 4,094,586
[45] June 13, 1978

[54] COMPACT ZOOM LENS

[75] Inventors: Yasuhisa Sato, Kawasaki; Sadahiko Tsuji, Yokohama; Katsumi Tanaka, Tokyo, all of Japan

[73] Assignee: Canon Kabushiki Kaisha, Tokyo, Japan

[21] Appl. No.: 736,941

[22] Filed: Nov. 1, 1976

[30] Foreign Application Priority Data

Nov. 5, 1975 Japan .................. 50-133320

[51] Int. Cl.² ............................. G02B 15/18
[52] U.S. Cl. ................................. 350/184
[58] Field of Search .................. 350/184, 186

[56] References Cited

U.S. PATENT DOCUMENTS

| 3,972,591 | 8/1976 | Suwa | 350/184 |
| 4,025,167 | 5/1977 | Ikeda | 350/184 |

*Primary Examiner*—Conrad J. Clark
*Attorney, Agent, or Firm*—Toren, McGeady and Stanger

[57] ABSTRACT

A zoom lens comprising, as viewed from the side of a photographing object, a first lens group, which is positive and is provided for focusing, including a positive lens formed by joining a negative lens and a positive lens together and a positive meniscus lens; a second lens group, which is negative and is provided for variation, including a negative lens and another negative lens formed by joining a negative lens and a positive lens together; a third lens group, which is provided for compensation, including a positive lens formed by joining a negative lens and a positive lens together; a fourth lens group which is positive and is provided for image formation; and a fifth lens group which is weakly negative, the third lens group drawing a concave locus toward the object side as the second lens group moves in the direction of an optical axis. The fourth lens group is composed of two positive meniscus lenses closedly adjacent to each other and a biconcave lens disposed apart from these meniscus lenses. The fifth lens group is composed of a biconvex lens, a negative lens disposed with its concave face directed toward the object and a positive lens disposed with its convex face toward the object.

10 Claims, 29 Drawing Figures

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

— 4,094,586 —

COMPACT ZOOM LENS

DETAILED DESCRIPTION OF THE INVENTION

This invention relates to a compact telephoto zoom lens which is, for example, of the class of F number 4, 70 mm - 200 mm, and in which aberration is satisfactorily compensated over the whole range of focal length.

The conventionally known telephoto type lens as typified by U.S. Pat. Nos. 3,336,094 and 3,615,125 is composed of a magnification varying part which comprises three lens groups arranged in order of, from the object side, a positively refractive lens group, a negatively refractive lens group and a positively refractive lens group and a fixing part (or an image forming lens) which comprises two lens groups. The second lens group is moved for varying the focal length and, concurrently with that, the third group is moved to compensate the consequent variation of the focal point.

In this type of zoom lenses in general, arrangement for a greater magnification varying ratio or a greater aperture ratio results in an increase in the length of the whole lens system or in the diameter of a front lens and such a zoom lens thus comes to present a problem in terms of compactness. The present invention is directed to the solution of this problem.

It is therefore a principal object of this invention to provide a zoom lens wherein the ratio of the length from the first lens plane to the focal plane, i.e. a telephoto ratio, is arranged to be about 1 and yet excellent compensation for aberration is ensured.

SUMMARY OF THE INVENTION

In such a compact zoom lens, it is important, first of all, to select suitable arrangement of refractive powers. Without suitable arrangement of such, aberration can not be compensated with any lens configuration. In a zoom lens of the type wherein the second lens group is moved in the direction of an optical axis and the positive third lens group is concavely moved relatively to the object as in the case of this invention, the total length of the zoom lens can be reduced by lessening the moving extent of the second group, by making the magnification varying part smaller and by making the fixed part (the fourth and fifth groups) into a telephoto type. With the magnification varying part made to be smaller, the refractive power of each of the first, second and third groups is thereby strengthened. This is detrimental to the compensation for aberration and there is a certain limit to such arrangement. As for making the fixed part into a telephoto type, there is also a certain limit thereto, because it results in a decrease in the telephoto ratio of the fixed part and it also makes the Petzval's sum a great negative value. In view of such limitations, when the magnification varying part is minimized, the refractive power arrangement and the lens configuration become important. The object of this invention is therefore attained with the refractive power, lens configuration and refractive index of the fourth group in the fixed part made to be of suitable values for adequate compensation of aberration. Further objects, advantages and features of this invention will become apparent from the following preferred embodiments taken in connection with the accompanying drawings.

BRIEF DESCRIPTION OF THE DRAWINGS

Referring to FIGS. 1 and 2 which illustrate preferred embodiments of this invention, a positive first lens group 1 which is provided for focusing consists of a sequential arrangement of a positive lens $r1 - r3$ formed by joining a negative lens and a positive lens together and a positive meniscus lens $r4 - r5$. A negative second lens group 2 which is provided for variation consists of a sequential arrangement of a negative lens $r6 - r7$ and a negative lens $r9 - r10$ formed by joining a negative lens and a positive lens. A positive third lens group 3 which is provided for compensation consists of a positive lens $r11 - r13$ formed by joining a negative lens and a positive lens together. An image forming fixed lens part comprises a positive fourth lens group 4 and a weakly negative fifth lens group 5. When the second lens group 2 moves in the direction of an optical axis, the third lens group 3 concurrently makes a reciprocative motion to draw a concave locus on the object side. In the zoom lens which is formed in this manner, the fourth lens group consists of two positive lenses $r14 - r15$ and $r16 - r17$ which are aligned, each of them with its stronger convex face (having a smaller radius of lens face curvature) toward the photographing object and a negative lens $r18 - r19$. However, the invention includes also a case where at least one of the two positive lens of the fourth lens group is a positive lens which is formed by joining a negative lens and a positive lens together. In an embodiment example represented by FIG. 2, one of the two positive lenses on the image side is formed by joining a negative single lens $r16 - ra$ and a positive single lens $ra - r17$ together. The fifth lens group consists of a sequential arrangement of a positive lens $r20 - r21$, a negative lens $r22 - r23$ which has a strong concave face on the object side and a positive lens $r24 - r25$. Assuming that $Fr$ represents a composite focal length of the fourth and fifth lens groups; $F4$ the focal length of the fourth lenses; $F4a$ a composite focal length of the positive lenses $r14 - r15$ and $r16 - r17$ within the fourth lens group; $d17$ a lens face distance on the axis between the negative lens $r18 - r19$ and the positive lens $r16 - r17$ disposed on the object side within the fourth lens group; $r14$ and $r16$ the radiuses of curvature of the two positive lenses $r14 - r15$ and $r16 - r17$ arranged within the fourth lens group; N9 and N10 the refractive indexes of the two positive single lenses r14 - r15 and r16 - r17 (excluding the negative single lens r16 - ra when it is joined) arranged within the fourth lens group, it is preferable that the zoom lens satisfy the following formulas of conditions:

Figure 1:
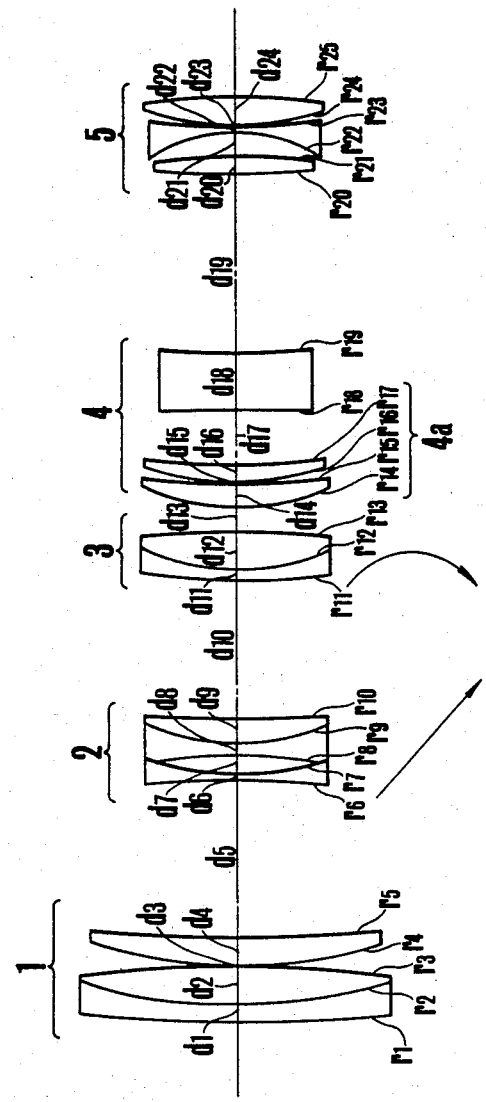
FIG. 1 is a sectional view illustrating the embodiment examples 1 and 2 of the invention.

$$0.8Fr < F4 < 12Fr \quad (1)$$

$$0.3Fr < F4a < 0.7Fr \quad (2)$$

$$0.06Fr < d17 < 0.1Fr \quad (3)$$

$$0.25Fr < r14 < 0.35Fr \quad (4)$$

$$0.35Fr < r16 < 0.5Fr \quad (5)$$

$$1.45 < (N9 + N10)/2 < 1.6 \quad (6)$$

In the above formulas of conditions, (1) and (2) relate to the arrangement of refractive powers of the fixed part and represent conditions desirable for shortening the total length of the lens system by making the fixed part a telephoto type. The formulas (3) through (6) represent conditions for keeping the whole lens system with adequate aberration compensation by compensating the aberration deterioration which makes place when the refractive power arrangement is determined under the conditions (1) and (2).

In the condition (1), when $f4$ exceeds the upper limit value, the length of the whole lens becomes too long for compactness though such is good for aberration compensation; while if $f4$ exceeds the lower limit value, the Petzval's sum of the whole lens system increases in the negative direction and this results in excessive compensation for the curvature of field and increase in astigmatism. In the condition (2), the whole length increases to impair compactness when $f4$ exceeds the upper limit value while there will be brought about a great degree of spherical aberration resulting in insufficient spherical aberration compensation as a whole when $f4$ exceeds the lower limit. With $f4$ exceeding the lower limit values of (1) and (2), adequate aberration compensation can not be attained even with the compensating conditions of the formulas (3) through (6) indicated above.

The condition (3) relates to an air gap $d17$ which has an effect on the principal aberrations such as spherical aberration, coma and astigmatism. This condition is an important feature of this invention. In the condition (3), when $d17$ exceeds the upper limit value, the compensation for spherical aberration and coma becomes insufficient while astigmatism compensation becomes excessive. This makes it difficult to compensate aberration through other parts for aberration compensation of the whole system. On the other hand, when $d17$ exceeds the lower limit value, the coma is over compensated while the astigmatism is under compensated.

The conditions (4) and (5) relate to compensation for spherical aberration and coma. With $r14$ and $r16$ exceeding the upper limit values set by these formulas of conditions, compensation for spherical aberration and coma aberration becomes insufficient. This makes it difficult to attain aberration compensation for the whole system through other parts. On the other hand, with $r14$ and $r16$ exceeding the lower limit value, the spherical aberration and the coma are over compensated.

The condition (6) relates to the Petzval's sum of the whole system. Under the conditions (1) and (2), the increase of the Petzval's sum of the whole system in the negative direction, which results from making the fixed part into a telephoto type, is compensated, according to this condition, by lowering the refractive powers of two positive lenses. In other words, in the condition (6), when the upper limit value is exceeded, the Petzval's sum increases in the negative direction to results in over compensation of curvature of the field and, when the lower limit value is exceeded, the spherical aberration is under compensated to make it difficult to attain adequate aberration compensation. The further details of the invention will be more fully understood from the following description of the embodiment examples:

In each of Examples 1, 2 and 3, the second positive lens is formed by joining a negative lens and a positive lens together, Example 1 being $f = 71.4 - 195.99$; Example 2 being $f = 81.00 - 194.44$ and Example 3 being $f = 81.01 - 194.46$, and each being F/4.0. Each of the examples brings about improved compensation for color spherical aberration.

Figure 2:
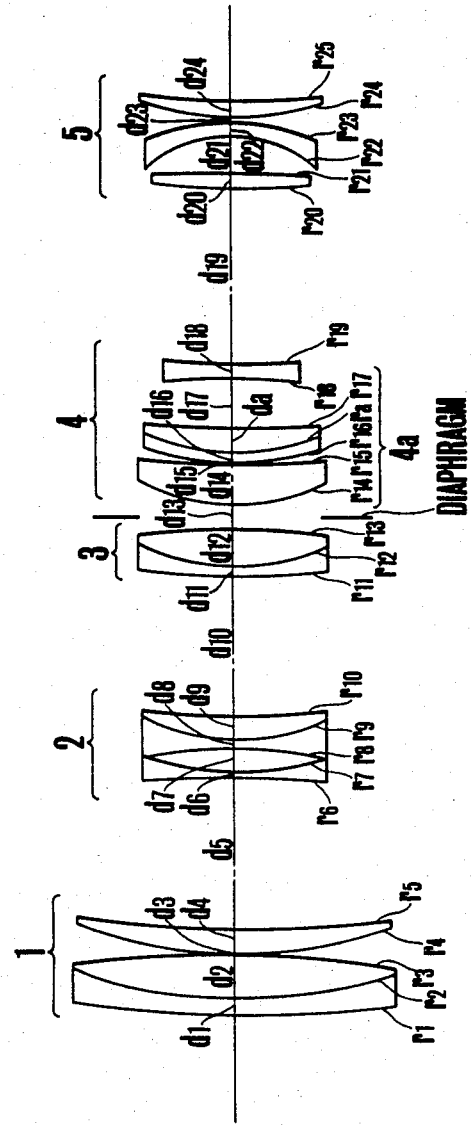
FIG. 2 is a sectional view illustrating the example 3 of the invention.
Figure 3A:
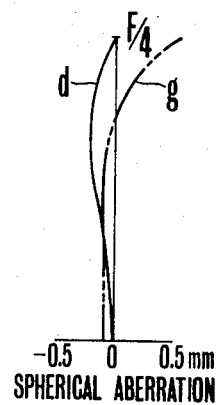
FIGS. 3A, 3B and 3C illustrate aberrations of Example 1 when $f = 71.4$.
Figure 3B:
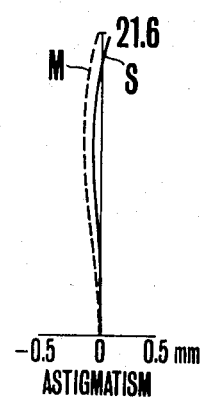
Figure 3C:
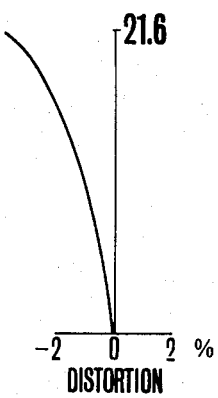
Figure 3D:
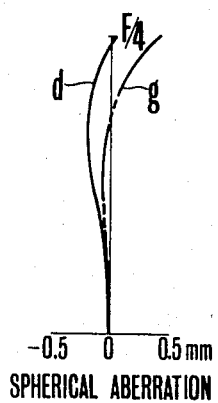
FIGS. 3D, 3E and 3F illustrate aberration of Example 1 when $f = 118.29$.
Figure 3E:
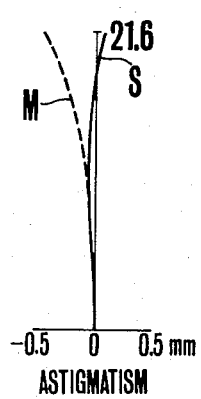
Figure 3F:
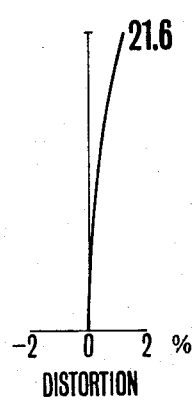
Figure 3G:
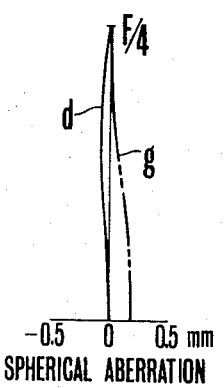
FIGS. 3G, 3H and 3I illustrate aberration of Example 1 when $f = 195.99$.
Figure 3H:
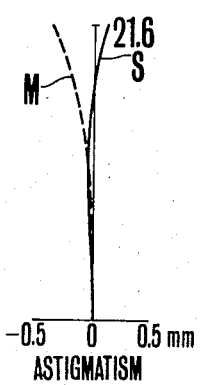
Figure 3I:
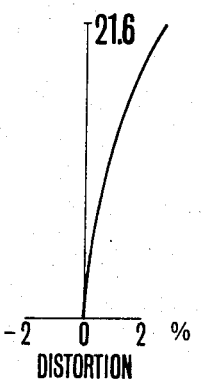
Figure 4A:
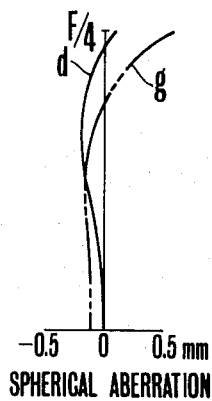
FIGS. 4A, 4B and 4C illustrate aberration of Example 2 when $f = 81.00$.
Figure 4B:
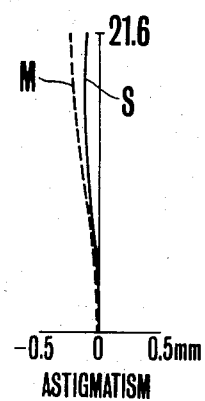
Figure 4C:
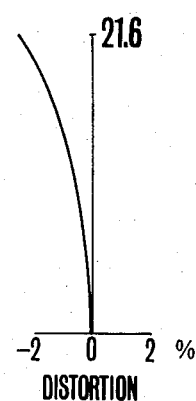
Figure 4D:
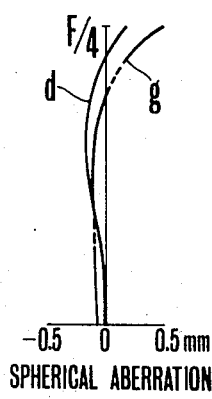
FIGS. 4D, 4E and 4F illustrate aberration of Example 2 when $f = 126.00$.
Figure 4E:
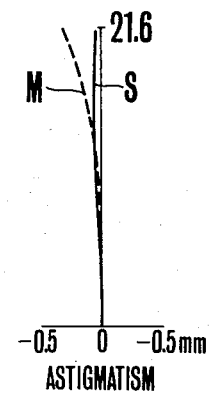
Figure 4F:
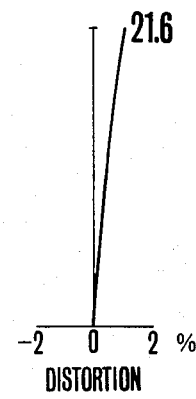
Figure 4G:
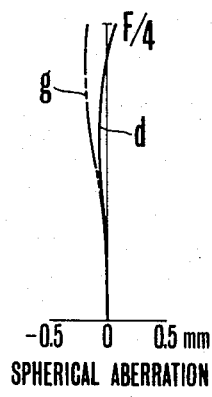
FIGS. 4G, 4H and 4I illustrate aberration of Example 2 when $f = 194.44$.
Figure 4H:
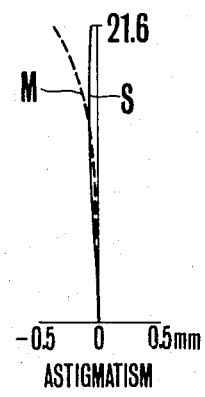
Figure 4I:
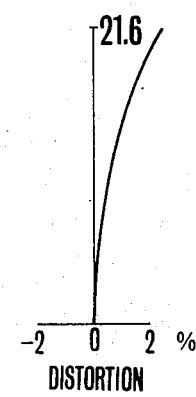
Figure 5A:
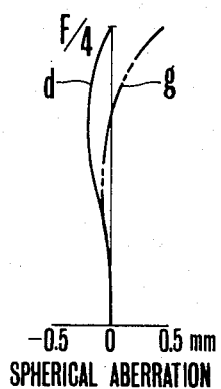
FIGS. 5A, 5B and 5C illustrate aberration of Example 3 when $f = 81.01$.
Figure 5B:
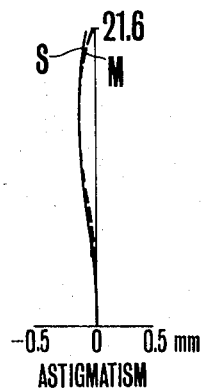
Figure 5C:
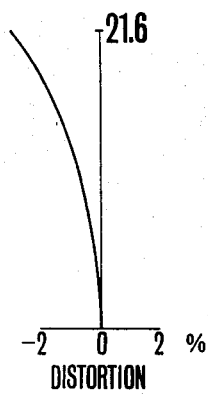
Figure 5D:
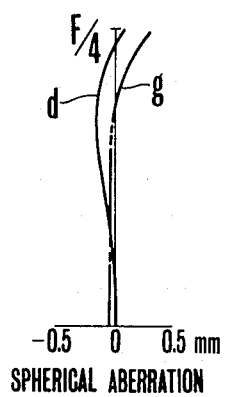
FIGS. 5D, 5E and 5F illustrate aberration of Example 3 when $f = 126.01$.
Figure 5E:
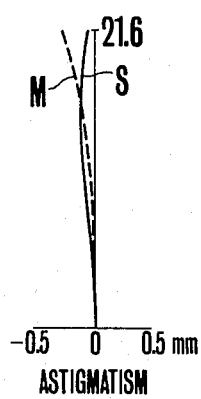
Figure 5F:
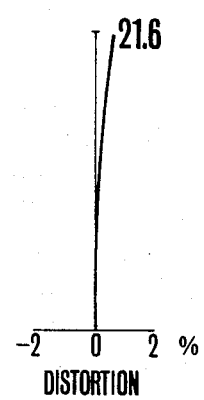
Figure 5G:
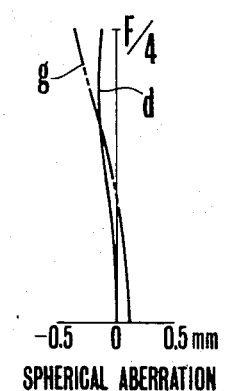
FIGS. 5G, 5H and 5I illustrate aberration of Example 3 when $f = 194.46$.
Figure 5H:
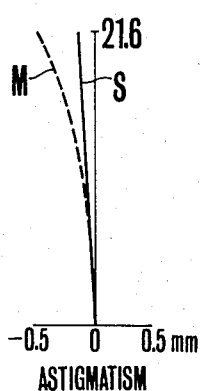
Figure 5I:
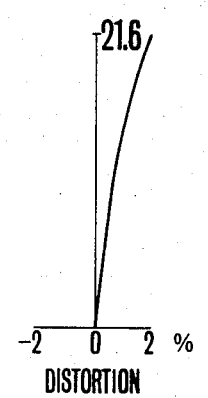

FIG. 1 illustrates the configurations of Examples 1 and 2 while FIG. 2 illustrates the configuration of Example 3. FIGS. 3A, 3B and 3C respectively illustrate the various aberrations including spherical aberration, astigmatism and distortion of Example 1 corresponding to each of different focal length values. FIGS. 4A, 4B and 4C illustrate various aberrations of Example 2 and FIGS. 5A, 5B and 5C various aberrations of Example 3.

In the following tables, $r$ represents radius of curvature of each lens; $d$ lens thickness on the axis thereof or distance between faces on the axis; $nd$ refractive index relative to the line $d$; and $vd$ the Abbe's number relative to the line $d$.

EXAMPLE 1    F = 71.4 - 195.99    F/1:4.0

| No. | r | d | vd | nd |
|---|---|---|---|---|
| 1 | 285.967 | 3.00 | 25.4 | 1.80518 |
| 2 | 96.160 | 7.65 | 61.1 | 1.58913 |
| 3 | −222.868 | 0.10 | | 1. |
| 4 | 84.085 | 5.04 | 61.1 | 1.58913 |
| 5 | 495.029 | $d_5$=variable | | 1. |
| 6 | −331.765 | 1.40 | 53.9 | 1.71300 |
| 7 | 55.672 | 3.27 | | 1. |
| 8 | −70.157 | 1.40 | 53.9 | 1.71300 |
| 9 | 37.045 | 3.85 | 25.4 | 1.80518 |
| 10 | 271.395 | $d_{10}$=variable | | 1. |
| 11 | 93.287 | 1.60 | 33.8 | 1.64769 |
| 12 | 32.468 | 5.82 | 61.1 | 1.58913 |
| 13 | −142.576 | $d_{13}$=variable | | 1. |
| 14 | 38.375 | 5.96 | 64.1 | 1.51633 |
| 15 | 165.946 | 0.85 | | 1. |
| 16 | 44.267 | 2.77 | 64.1 | 1.51633 |
| 17 | 76.858 | 10.57 | | 1. |
| 18 | 3072.885 | 1.78 | 28.3 | 1.74000 |
| 19 | 83.148 | 29.87 | | 1. |
| 20 | 193.897 | 3.11 | 49.3 | 1.60729 |
| 21 | −82.538 | 5.65 | | 1. |
| 22 | −24.269 | 1.95 | 50.9 | 1.65844 |
| 23 | −435.335 | 0.06 | | 1. |
| 24 | 68.442 | 3.71 | 49.3 | 1.60729 |
| 25 | −149.072 | 41.91 | | 1. |

Variable Distance:

| f | 71.40 | 118.29 | 195.99 |
|---|---|---|---|
| $d_5$ | 3.23 | 28.19 | 43.26 |
| $d_{10}$ | 41.54 | 26.47 | 1.51 |
| $d_{13}$ | 12.00 | 2.11 | 12.00 |

Fr = 116.16
$F_4$ = 110.30 = 0.95 Fr
$F_{4a}$ = 64.74 = 0.59 Fr

EXAMPLE 2    $f = 81.00 - 194.44$    F/1:4.0

| No. | r | d | vd | nd |
|---|---|---|---|---|
| 1 | 299.582 | 3.00 | 25.4 | 1.80518 |
| 2 | 99.340 | 6.40 | 61.1 | 1.58913 |
| 3 | −223.035 | 0.10 | | 1. |
| 4 | 85.752 | 4.89 | 61.1 | 1.58913 |
| 5 | 535.718 | $d_5$ = variable | | 1. |

-continued

| | | | | |
|---|---|---|---|---|
| 6 | −303.748 | 1.60 | 53.9 | 1.71300 |
| 7 | 58.079 | 2.97 | | 1. |
| 8 | −74.086 | 1.60 | 53.9 | 1.71300 |
| 9 | 39.082 | 4.19 | 25.4 | 1.80518 |
| 10 | 321.421 | $d_{10}$ = variable | | 1. |
| 11 | 102.994 | 1.60 | 33.8 | 1.64769 |
| 12 | 35.328 | 6.44 | 61.1 | 1.58913 |
| 13 | −129.625 | $d_{13}$ = variable | | 1. |
| 14 | 38.933 | 4.44 | 64.1 | 1.51633 |
| 15 | 196.503 | 0.20 | | 1. |
| 16 | 50.668 | 2.52 | 64.1 | 1.51633 |
| 17 | 88.204 | 9.11 | | 1. |
| 18 | −649.191 | 9.79 | 28.3 | 1.74000 |
| 19 | 87.775 | 30.01 | | 1. |
| 20 | 150.725 | 3.36 | 49.3 | 1.60729 |
| 21 | −65.259 | 3.59 | | 1. |
| 22 | −26.416 | 1.50 | 53.3 | 1.69350 |
| 23 | 223.506 | 0.10 | | 1. |
| 24 | 62.316 | 3.97 | 49.3 | 1.60729 |
| 25 | −144.433 | | | 1. |

Variable Distance:

| f | 81.00 | 126.00 | 194.44 |
|---|---|---|---|
| $d_5$ | 3.540 | 25.760 | 39.840 |
| $d_{10}$ | 37.346 | 23.061 | 1.332 |
| $d_{13}$ | 12.000 | 4.065 | 11.713 |

$Fr = 123.74$
$F_4 = 121.47 = 0.98\, Fr$
$F_{4s} = 66.25 = 0.54\, Fr$

EXAMPLE 3    $f = 81.01 - 194.46$    F/1:4.0

| No. | r | d | vd | nd |
|---|---|---|---|---|
| 1 | 302.521 | 3. | 25.4 | 1.80518 |
| 2 | 99.734 | 6.034 | 61.1 | 1.58913 |
| 3 | −276.288 | 0.1 | | 1. |
| 4 | 87.859 | 4.89 | 61.1 | 1.58913 |
| 5 | 1521.034 | $d_5$ = variable | | 1. |
| 6 | −249.143 | 1.6 | 53.9 | 1.713 |
| 7 | 58.335 | 2.97 | | 1. |
| 8 | −75.382 | 1.6 | 53.9 | 1.713 |
| 9 | 40.008 | 4.19 | 25.4 | 1.80518 |
| 10 | 370.374 | $d_{10}$ = variable | | 1. |
| 11 | 104.198 | 1.6 | 33.8 | 1.64769 |
| 12 | 36.579 | 6.44 | 61.1 | 1.58913 |
| 13 | −129.164 | $d_{13}$ = variable | | 1. |
| 14 | 36.673 | 6.94 | 64.1 | 1.51633 |
| 15 | 188.364 | 0.6 | | 1. |
| 16 | 54.993 | 1.46 | 33.8 | 1.64769 |
| ra | 31.252 | 3.85 | 53.6 | 1.54739 |
| 17 | 144.658 | 8.71 | | 1. |
| 18 | −158.414 | 2.39 | 40.9 | 1.80610 |
| 19 | 114.916 | 33.17 | | 1. |
| 20 | 388.587 | 2.42 | 49.3 | 1.60729 |
| 21 | −95.805 | 4.48 | | 1. |
| 22 | −24.88 | 1.32 | 57.0 | 1.6228 |
| 23 | −60.604 | 0.3 | | 1. |
| 24 | 49.996 | 2.95 | 53.6 | 1.54739 |
| 25 | 126.851 | | | 1. |

| f | 81.01 | 126.01 | 194.46 |
|---|---|---|---|
| $d_5$ | 3.923 | 26.143 | 40.223 |
| $d_{10}$ | 37.211 | 22.925 | 1.196 |
| $d_{13}$ | 12.000 | 4.065 | 11.714 |

$Fr = 123.75$
$F_4 = 129.81 = 1.05\, Fr$
$F_{4s} = 61.42 = 0.50\, Fr$

What is claimed is:

1. A compact zoom lens comprising:
a first lens group which has a positive refractive power and consists of a positive lens formed by joining a negative lens and a positive lens together and a positive meniscus lens, the first lens group being movable for focusing;
a second lens group which has a negative refractive power and is disposed in the rear of the first lens group on the axis thereof, the second lens group consisting of a negative lens and another negative lens formed by joining a negative lens and a positive lens together, the second lens group being movable for variation;
a third lens group which has a positive refractive power and is disposed in the rear of the second group on the axis thereof, the third group consisting of a positive lens formed by joining a negative lens and a positive lens together, the third lens group being movable for compensation concurrently with the second lens group, the locus of the movement of the third group being in a concave shape as viewed from the side of an photographing object; and
an image forming lens group which has a positive refractive power and is disposed in the rear of the third lens group on the axis thereof, the image forming lens group consisting of a front sub-group and a rear sub-group, the front sub-group having a positive refractive power and being composed of two positive lenses each having a convex face on the object side and a negative lens being disposed apart from these two lenses on their axis, the rear sub-group being composed of a positive lens, a negative lens having a concave face on the object side; and a positive lens having a convex face on the object side.

2. A compact zoom lens according to claim 1 wherein the positive lens disposed on the image side in the front sub-group and the negative lens in the same sub-group are spaced on the axis thereof at an interval of more than 0.070 time and less than 0.091 times the focal length of said image forming lens group.

3. A compact zoom lens according to claim 1 wherein the focal length of said front sub-group is more than 0.95 times and less than 1.05 times the focal length of said image forming lens group.

4. A compact zoom lens according to claim 1 wherein the composite focal length of the two positive lenses in said front sub-group is more than 0.50 times and less than 0.59 times the focal length of said image forming lens group.

5. A compact zoom lens according to claim 1 wherein one of the two positive lenses in said front sub-group is formed by joining a negative meniscus lens and a positive meniscus lens together.

6. A compact zoom lens according to claim 1 wherein said front sub-group consists of two positive miniscus lenses having their convex faces directed to the object and a biconcave lens disposed apart from these two lenses on the axis thereof; and said rear sub-group consists of a biconvex lens, a negative lens which has a concave face directed to the object and the radius of curvature of its lens face on the object side of the object is less than the radius of curvature of its face on the image side and a positive lens which has a convex face directed to the object.

7. A compact zoom lens according to claim 6 wherein the positive meniscus lens of said front sub-group disposed nearer to the image is formed by joining a negative meniscus lens and a positive meniscus lens together.

8. A compact zoom lens according to claim 6 wherein:

$f = 71.4 - 195.99$    F1:4.0

| No. | r | d | vd | nd |
|---|---|---|---|---|
| 1 | 285.967 | 3.00 | 25.4 | 1.80518 |
| 2 | 96.160 | 7.65 | 61.1 | 1.58913 |
| 3 | −222.868 | 0.10 | | 1. |
| 4 | 84.085 | 5.04 | 61.1 | 1.58913 |
| 5 | 495.029 | $d_5$ = variable | | 1. |
| 6 | −331.765 | 1.40 | 53.9 | 1.71300 |
| 7 | 55.672 | 3.27 | | 1. |
| 8 | −70.157 | 1.40 | 53.9 | 1.71300 |

-continued

| | | | | |
|---|---|---|---|---|
| 9 | 37.045 | 3.85 | 25.4 | 1.80518 |
| 10 | 271.395 | $d_{10}$ = variable | | 1. |
| 11 | 93.287 | 1.60 | 33.8 | 1.64769 |
| 12 | 32.468 | 5.82 | 61.1 | 1.58913 |
| 13 | −142.576 | $d_{13}$ = variable | | 1. |
| 14 | 38.375 | 5.96 | 64.1 | 1.51633 |
| 15 | 165.946 | 0.85 | | 1. |
| 16 | 44.267 | 2.77 | 64.1 | 1.51633 |
| 17 | 76.858 | 10.57 | | 1. |
| 18 | 3072.885 | 1.78 | 28.3 | 1.74000 |
| 19 | 83.148 | 29.87 | | 1. |
| 20 | 193.897 | 3.11 | 49.3 | 1.60729 |
| 21 | −82.538 | 5.65 | | 1. |
| 22 | −24.269 | 1.95 | 50.9 | 1.65844 |
| 23 | −435.335 | 0.06 | | 1. |
| 24 | 68.442 | 3.71 | 49.3 | 1.60729 |
| 25 | −149.072 | 41.91 | | 1. |

Variable distance:

| | | | |
|---|---|---|---|
| f | 71.40 | 118.29 | 195.99 |
| $d_5$ | 3.23 | 28.19 | 43.26 |
| $d_{10}$ | 41.54 | 26.47 | 1.51 |
| $d_{13}$ | 12.00 | 2.11 | 12.00 | in the above table, r representing the radius of lens face curvature; d either lens thickness or an air gap; and vd and Abbe's number; and nd a refractive index.

9. A compact zoom lens according to claim 6 wherein:

$f = 81.00 - 194.44$    F1:4.0

| No. | r | d | vd | nd |
|---|---|---|---|---|
| 1 | 299.582 | 3.00 | 25.4 | 1.80518 |
| 2 | 99.340 | 6.40 | 61.1 | 1.58913 |
| 3 | −223.035 | 0.10 | | 1. |
| 4 | 85.752 | 4.89 | 61.1 | 1.58913 |
| 5 | 535.718 | $d_5$=variable | | 1. |
| 6 | −303.748 | 1.60 | 53.9 | 1.71300 |
| 7 | 58.079 | 2.97 | | 1. |
| 8 | −74.086 | 1.60 | 53.9 | 1.71300 |
| 9 | 39.082 | 4.19 | 25.4 | 1.80518 |
| 10 | 321.421 | $d_{10}$=variable | | 1. |
| 11 | 102.994 | 1.60 | 33.8 | 1.64769 |
| 12 | 35.328 | 6.44 | 61.1 | 1.58913 |
| 13 | −129.625 | $d_{13}$=variable | | 1. |
| 14 | 38.933 | 4.44 | 64.1 | 1.51633 |
| 15 | 196.503 | 0.20 | | 1. |
| 16 | 50.668 | 2.52 | 64.1 | 1.51633 |
| 17 | 88.204 | 9.11 | | 1. |
| 18 | −649.191 | 9.79 | 28.3 | 1.74000 |
| 19 | 87.775 | 30.01 | | 1. |
| 20 | 150.725 | 3.36 | 49.3 | 1.60729 |
| 21 | −65.259 | 3.59 | | 1. |
| 22 | −26.416 | 1.50 | 53.3 | 1.69350 |
| 23 | 223.506 | 0.10 | | 1. |
| 24 | 62.316 | 3.97 | 49.3 | 1.60729 |
| 25 | −144.433 | | | 1. |

Variable distance:

| | | | |
|---|---|---|---|
| f | 81.00 | 126.00 | 194.44 |
| $d_5$ | 3.540 | 25.760 | 39.840 |
| $d_{10}$ | 37.346 | 23.061 | 1.332 |
| $d_{13}$ | 12.000 | 4.065 | 11.713 | in the above table, r representing the radius of lens face curvature; d either lens thickness or an air gap; vd an Abbe's number; and nd a refractive index.

10. A compact zoom lens according to claim 6 wherein:

$f = 81.01 - 194.46$    F1:4.0

| No. | r | d | vd | nd |
|---|---|---|---|---|
| 1 | 302.521 | 3. | 25.4 | 1.80518 |
| 2 | 99.734 | 6.034 | 61.1 | 1.58913 |
| 3 | −276.288 | 0.1 | | 1. |
| 4 | 87.859 | 4.89 | 61.1 | 1.58913 |
| 5 | 1521.034 | $d_5$=variable | | 1. |
| 6 | −249.143 | 1.6 | 53.9 | 1.713 |
| 7 | 58.335 | 2.97 | | 1. |
| 8 | −75.382 | 1.6 | 53.9 | 1.713 |
| 9 | 40.008 | 4.19 | 25.4 | 1.80518 |
| 10 | 370.374 | $d_{10}$=variable | | 1. |
| 11 | 104.198 | 1.6 | 33.8 | 1.64769 |
| 12 | 36.579 | 6.44 | 61.1 | 1.58913 |
| 13 | −129.164 | $d_{13}$=variable | | 1. |
| 14 | 36.673 | 6.94 | 64.1 | 1.51633 |
| 15 | 188.364 | 0.6 | | 1. |
| 16 | 54.993 | 1.46 | 33.8 | 1.64769 |
| ra | 31.252 | 3.85 | 53.6 | 1.54739 |
| 17 | 144.658 | 8.71 | | 1. |
| 18 | −158.414 | 2.39 | 40.9 | 1.80610 |
| 19 | 114.916 | 33.17 | | 1. |
| 20 | 388.587 | 2.42 | 49.3 | 1.60729 |
| 21 | −95.805 | 4.48 | | 1. |
| 22 | −24.88 | 1.32 | 57.0 | 1.6228 |
| 23 | −60.604 | 0.3 | | 1. |
| 24 | 49.996 | 2.95 | 53.6 | 1.54739 |
| 25 | 126.851 | | | 1. |

| | | | |
|---|---|---|---|
| f | 81.01 | 126.01 | 194.46 |
| $d_5$ | 3.923 | 26.143 | 40.223 |
| $d_{10}$ | 37.211 | 22.925 | 1.196 |
| $d_{13}$ | 12.000 | 4.065 | 11.714 | in the above table, r representing the radius of lens face curvature; d either lens thickness or an air gap; vd an Abbe's number; and nd a refractive index.

* * * * *

UNITED STATES PATENT OFFICE
CERTIFICATE OF CORRECTION

Patent No. 4,094,586          Dated June 13, 1978

Inventor(s) Yasuhisa Sato, S. Tsuji, K. Tanaka

It is certified that error appears in the above-identified patent and that said Letters Patent are hereby corrected as shown below:

In the heading of the patent [75] should read as follows:

[75] Inventors: Yasuhisa Sato, Kanagawa-Ken
Sadahiko Tsuji, Yokohama;
Katsumi Tanaka, Tokyo, all of Japan Signed and Sealed this Twenty-eighth Day of November 1978

[SEAL]

Attest:

RUTH C. MASON
Attesting Officer

DONALD W. BANNER
Commissioner of Patents and Trademarks